Feb. 8, 1966     H. J. TAYLOR ET AL     3,234,346
E-SHAPED BIMETALLIC ACTUATOR

Filed Jan. 28, 1963     2 Sheets-Sheet 1

Inventors
Herbert J. Taylor
Gordon R. Boyd
By Stevens, Davis, Miller + Mosher
Attorneys Inventors
Herbert J. Taylor
Gordon R. Boyd
By Stevens, Davis, Miller & Mosher
Attorneys

# United States Patent Office 3,234,346
Patented Feb. 8, 1966

3,234,346
E-SHAPED BIMETALLIC ACTUATOR
Herbert J. Taylor, Portland, and Gordon R. Boyd, Beaverton, Oreg., assignors to Mears Controls, Inc., Beaverton, Oreg.
Filed Jan. 28, 1963, Ser. No. 254,239
5 Claims. (Cl. 200—113)

This invention relates to improvements in electric load regulating devices and bimetal members therefore. More particularly, the invention is concerned with a load regulator device of the current limiting type especially suitable for use in a power distribution system to limit the amount of current drawn by an individual consumer or by an individual circuit of a consumer.

One important practical application of such a device is as a current sensitive relay for disconnecting a second priority circuit when the load in a first priority circuit exceeds a calibrated value, whereby to avoid excessive total currents. Alternatively, two or more lower priority circuits may be disconnected at various values of the current in the first priority circuit.

The object of the invention is to provide such a device with improved operating characteristics. The nature of such improvements will appear from the specific description which follows.

The accompanying drawings illustrate one manner of carrying the invention into practice, this illustration and the corresponding description having been provided merely by way of example and not by way of limitation, the scope of the invention being defined by the appended claims.

Figure 1:
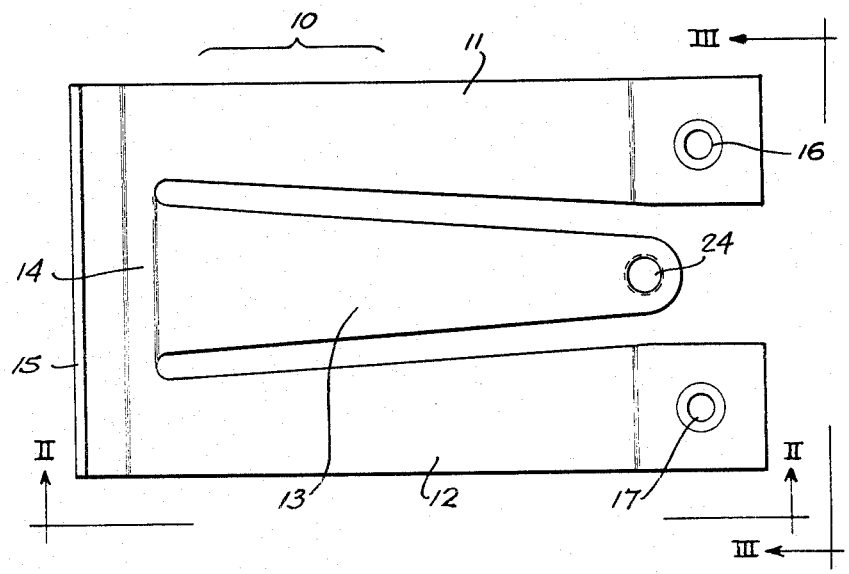
Figure 2:
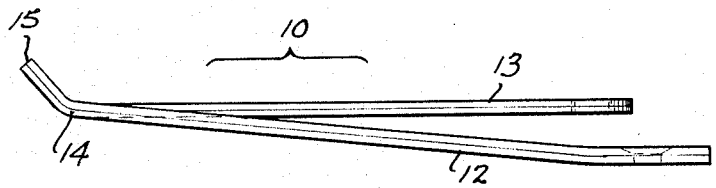
Figure 3:
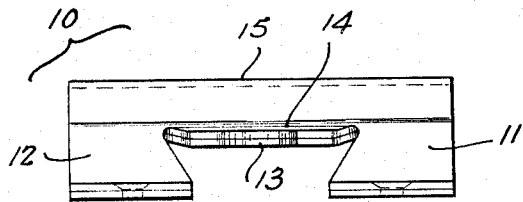
Figure 5:
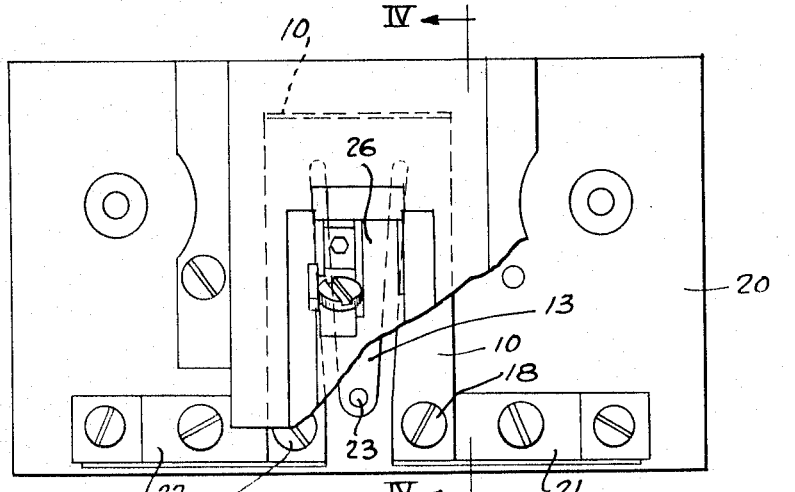
Figure 4:
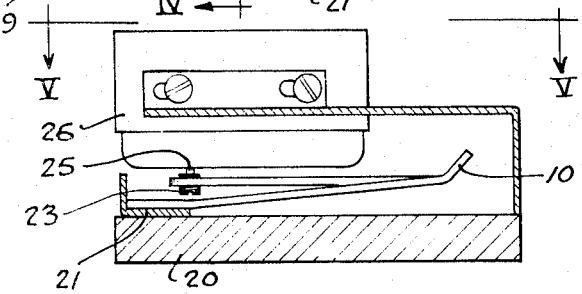
Figure 6:
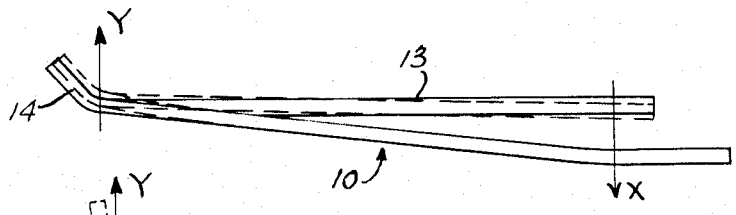
Figure 7:
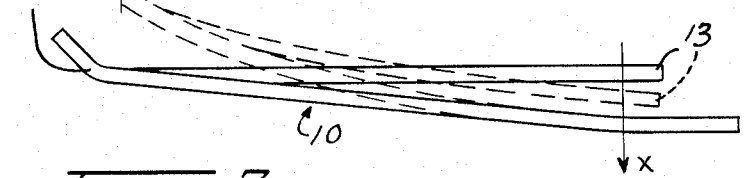

In the drawings:
FIGURE 1 is a plan view of a bimetal member for use in the invention;
FIGURE 2 is a side view taken on II—II in FIGURE 1;
FIGURE 3 is an end view taken on III—III in FIGURE 1;
FIGURE 4 shows by a section on IV—IV in FIGURE 5 the manner of mounting the bimetal member of FIGURES 1 to 3 in a load regulator;
FIGURE 5 is a partly cut-away view on V—V in FIGURE 4.
FIGURE 6 is a view similar to FIGURE 2 showing movement of the bimetal member on passage of tripping current; and
FIGURE 7 is a further similar view showing movement of the bimetal member on passage of rated current.

The member 10 shown in FIGURES 1 to 3 is formed in one piece from a sheet of bimetallic material which will flex with temperature changes in the usual way. The member consists of a pair of outer, tapering (or trapezoidal) legs 11 and 12 with a tapering (or trapezoidal) central leg 13 disposed between them. All three legs are generally parallel with each other and are joined together at one end of the member 10 by a bridging portion 14 provided with a bent up flange 15.

At their free ends the outer legs 11 and 12 are provided with countersunk holes 16 and 17 in which are secured fixing screws 18 and 19 (FIGURE 5.) In this way the member 10 is secured to an insulating base 20 and electrical contact is established between the end of each leg remote from the bridging portion 14 and a respective external terminal structure 21, 22 respectively.

The central leg 13 carries at its free end a calibrating screw 23 engaged in a tapped hole 24 in the leg 13. Once set in a desired position, this screw 23 will be fixed in place by a suitable sealing compound. The base of the screw 23 contacts the actuating plunger 25 of a conventional switch 26.

In operation, terminals 21, 22 are series connected in the first priority circuit, so that the current in this circuit traverses the outer legs 11 and 12 as well as the bridging portion 14. This current generates heat in proportion to the square of its value and the resistance encountered, and this heat causes a rise in temperature and consequent flexure of the member 10. The low expansion metal is placed on top, in the view of FIGURES 2, 6 and 7, so that on heating by a tripping current, say 12 amps, with the right hand ends of legs 11 and 12 fixed by screws 18, 19, the member 10 assumes the broken line position of FIGURE 6.

Typical time/current characteristics for this condition are:

| Duration of Current | Motion X down | Motion Y up |
|---|---|---|
| 2 minutes | .008" | .009" |
| 3 minutes | .010" | .012" |
| 5 minutes | .010" | .014" |
| Continuous | .010" | .019" |

It will be noted that, although motion Y continues to increase with time, motion X soon reaches a steady condition. This is because motion X is due to the differential temperature between the central and outer legs. The differential temperature soon reaches a substantially constant value, even when the temperature of the outer legs 11, 12 is still increasing, by reason of heat transfer from these outer legs to the central leg 13.

Conveniently, the calibration screw 23 can be set (in the example given) to actuate switch 26 to open a second priority circuit on movement of this screw .010".

The rated current (maximum permissible continuous current) of the device could for example be chosen as 40 amps. The flexure of bimetal member 10 with 40 amps flowing in the outer legs 11, 12 is typically:

| Duration of Current | Motion X down | Motion Y up |
|---|---|---|
| 2 minutes | .094" | .130" |
| 3 minutes | .095" | .137" |
| 5 minutes | .094" | .164" |
| Continuous | .085" | .182" |

Although motion Y continues to increase, motion X even experiences a slight decrease with time, due to increased heat transfer between the legs. This is of no consequence in relation to initial operation of the device, since switch 26 has long since been actuated, but it plays a part in reducing the reset time. When current ceases and the outer legs cool down, they continue for some time to supply heat to the central leg, with the result that equality or near equality of temperature between the outer and central legs is achieved before these parts have cooled down to the ambient temperature. Since deflection of the screw 23 and hence actuation of the switch 26 is a function of the differential temperature between the outer and central legs, resetting is achieved some time in advance of full cooling down of all parts of the member 10.

In addition this dependence on differential temperature virtually eliminates any effect of the ambient temperature as an operational factor. The central leg 13 can thus be considered as an ambient temperature compensation leg.

The tapered form of the working (outer) legs 11 and 12 provides a temperature gradient along these legs, the temperature being highest near the bridging portion 14, since the resistance of each leg is a maximum at this end. A non-linear curvature of these legs is thus achieved, which increases the work output at the free end of the central leg. The temperature gradient also permits the parts of the bimetal member 10 remote from the terminal structures 21, 22 to be operated at a higher temperature than would be permissible if all the parts were at substantially the same temperature, because the limits placed on temperature rise by standards specifications and like regulations apply most stringently to the terminal portions of such devices. Thus the flexing end of the bimetal member can be used more effectively, while undue heating of the wiring connected to the terminals or of the insulating base is avoided.

The flange 15 prevents inaccuracies that might otherwise arise as a result of cross bending of the bimetal member 10.

If two or more lower priority circuits are to be opened by the current in a main, first priority circuit, a corresponding number of assemblies of FIGURE 5 are placed side by side with their bimetal members connected in series. The switches 26 then each control a lower priority circuit in a sequence of operations with ascending current value in the main circuit, as determined by the tripping settings of the respective calibrating screws 23.

We claim:

1. A bimetal member comprising a sheet of bimetallic material shaped to provide a pair of outer legs and a central leg disposed between said outer legs, said legs all extending generally parallel to each other, and a bridging portion at one end of said sheet interconnecting adjacent ends of said legs, said outer legs being tapered from a smaller cross section at their ends adjacent said bridging portion to a larger cross section at their ends remote therefrom, the end of the central leg remote from said bridging portion being free from connection to said outer legs, adjustable switch actuation means mounted on said free end, said taper causing a non-uniform temperature gradient along said legs thereby causing a non-linear curvature of said outer legs when heated whereby the work output of the free end of said central leg is increased and the highest temperatures occur at a point remote from said free end of said central leg.

2. A bimetal member according to claim 1, wherein said bridging portion includes a bent up flange stiffening said portion against bending transversely of the direction of extent of said legs.

3. A bimetal member according to claim 1, wherein said central leg is tapered from a larger cross section adjacent said bridging portion to a smaller cross section at its end remote therefrom.

4. A load regulator device comprising
(a) a bimetal member comprising a sheet of bimetallic material shaped to provide a pair of outer legs and a central leg disposed between said outer legs, said legs all extending generally parallel to each other, and a bridging portion at one end of said sheet interconnecting adjacent ends of said legs, said outer legs being tapered from a smaller cross section at their ends adjacent said bridging portion to a larger cross section at their ends remote therefrom, the end of the central leg remote from said bridging portion being free from connection to said outer legs, adjustable switch actuation means mounted on said free end,
(b) an insulating base, means securing said remote ends of said outer legs to said base and terminal means for passing a current through said bimetal member from one said remote end to the other, said taper causing a non-uniform temperature gradient along said legs thereby causing a non-linear curvature of said outer legs when heated whereby the work output of the free end of said central leg is increased and the highest temperatures occur at a point remote from said terminal means,
(c) and switch means sensitive to deflection of the switch actuation means on said central leg remote from said bridging portion.

5. A load regulator device according to claim 4, wherein said central leg is tapered from a larger cross section adjacent said bridging portion to a smaller cross section at its end remote therefrom.

References Cited by the Examiner

UNITED STATES PATENTS

| 1,513,210 | 10/1924 | Banan | 200—122 |
| 2,284,383 | 5/1942 | Elmer | 200—113 |
| 2,503,008 | 4/1950 | Taylor | 200—122 |
| 2,518,361 | 8/1950 | Mosley | 200—113 X |
| 2,520,874 | 8/1950 | Bean | 200—113 |
| 2,609,466 | 9/1952 | Blonder | 200—113 |
| 2,632,824 | 3/1953 | Malone | 200—113 |
| 2,777,032 | 1/1957 | Birch | 200—113 |
| 2,947,979 | 8/1960 | Boddy | 200—122 |

FOREIGN PATENTS

| 621,637 | 6/1961 | Canada. |
| 646,009 | 6/1937 | Germany. |

BERNARD A. GILHEANY, *Primary Examiner.*